3,389,019
METHOD OF MANUFACTURING AN Ag AND Ni-CONTAINING ELECTRODE FOR AN ELECTROCHEMICAL GENERATOR
Paul Biro, 17 Ave. de Saxe, Paris, France
No Drawing. Filed June 5, 1964, Ser. No. 373,609
Claims priority, application France, June 12, 1963, 937,879; Dec. 16, 1963, 957,278
13 Claims. (Cl. 136—120)

The present invention concerns an electrode for electrochemical generation and, more particularly, an electrode for diffusion of gas, its preparation and a few of its various uses.

It is a well known principle that when a gas diffusing electrode combines with a second electrode in an appropriate electrolyte, a unit can be formed which produces economical electric power from a combustion gas for example, hydrogen or oxygen.

These electrodes have a porosity which enables them to become balanced, with the aid of the gas at a determined pressure, and the capillary forces of the electrolyte, and thus constitutes a several phase unit in the interior of the electrode itself. This contact area constitutes the place where the electrochemical reaction takes place.

These electrodes must fulfill various conditions, the most essential of which are the following:

(a) To possess high electron conductivity,
(b) To be capable of creating, within their mass, contact between the three phases: electrolyte, electrode, and reacting gases,
(c) To possess sufficient mechanical strength,
(d) To resist corrosion by the ambient medium within the cell,
(e) To be insensitive to the impurities of the different existing phases,
(f) To be able to supply a high density current without too much polarization,
(g) To be able to function continuously for very long periods,
(h) And to contain one or several bodies acting as catalysts for the required reaction.

Generally speaking, in order to obtain appreciable yield, the electrodes used are specific to the gases with which they are supplied. It frequently results that these electrodes undergo changes in the course of functioning, for example, they can become poisoned due to matter originating from the opposite electrode.

These disadvantages can be partially remedied by the use of platinum electrodes, which can be used for oxydizer or reducer gases. Performances for these electrodes are, however, irregular and diminish with time.

The invention concerns an electrode for an electrochemical generator with higher performances than those electrodes known at the present time.

The invention has for its object an electrode containing agglomerated nickel grains in intimate contact with finely divided silver and is characterized by the fact that it can function as a reversible electrode, under normal conditions, for example in the reaction $H_2 + \frac{1}{2} O_2 \rightleftharpoons H_2O$. Thus, it allows the reaction to develop indiscriminately, depending upon the existing percentages of hydrogen and oxygen.

An electrode is keeping with the invention can be used in a fuel cell both as a positive electrode and as a negative electrode, which affords the definite advantage of one of the electrodes having substantially no influence on the other. The distinction between electrodes is only made by reason of the nature of the gas with which they are supplied. For example, where hydrogen and oxygen are concerned, the potential of the hydrogen electrode is obtained only through the simple presence of gaseous hydrogen and the potential of the oxygen electrode is obtained only through the simple presence of gaseous oxygen. These gases may be common, commercial hydrogen and oxygen.

According to the present invention, the silver present in the electrode, and which of course takes part in the desired catalytic reaction, is introduced into the electrode in situ by a dry and not a wet method.

In an application of one of the embodiments of this invention, the silver is introduced through the thermic decomposition of an oxygen compound of silver, for example, silver oxide, the said decomposition being effected in the presence of grains of nickel.

The nickel powder used is obtained generally through the decomposition of a nickel salt, for example, nickel formate, nickel carbonyl, or nickel carbonate.

According to the present invention, the mixture of the nickel and the oxygenated silver compound is sintered in a neutral or inert atmosphere in a first stage, and sintered in a reducing atmosphere in a second stage.

During the first sintering process, in the neutral atmosphere, the major part of the oxygenated silver compound, for example, silver oxide is decomposed and part of the oxygen thus liberated is fixed by the nickel.

During the second sintering process in a reducing atmosphere, for example hydrogen, the nickel oxide formed is reduced to metallic nickel containing a surface state different to that of the original nickel. The remaining silver oxide is also reduced.

If necessary, the two sintering operations can be separated by a cooling period.

According to the invention, the mixture used in the manufacture of the electrode of the present invention contains 5 to 85%, preferably 50% by weight of a compound, such as, for example, silver oxides, which through thermic decomposition produces silver, and 95 to 15%, preferably 50% by weight of nickel, originating for example, from the decomposition of nickel carbonyl, nickel formate or nickel carbonate.

In a manner of application of the invention, treatment is the following:

A mixture of powders is made with equal quantities of silver oxide and nickel originating from, for example, nickel carbonyl, nickel formate or nickel carbonate. This mixture is placed in a mixer and is homogenized in a damp medium, for example, a benzene medium, for about two hours. When the mixture is completely homogeneous, it is air dried.

The mixture is then compressed with the aid of a hydraulic press at a compression value of between 100 and 4000 kg. per cm.$^2$, preferably about 1500 kg. per cm.$^2$. In order to decompose the silver oxide, the compressed electrode is heated in a neutral atmosphere consisting, for example, of argon, at a temperature of between 250 and 500° C., preferably about 370° C. Heating time lasts for a few hours. In order to assure proper decomposition of silver oxide, the rise in temperature is slow. A rise of the order of 100° C. to 150° C. per hour may be cited as an example.

After this stage, the electrode is subjected to a second sintering process in a reducing atmosphere, hydrogen for example, at a temperature of between 250° C. and 500° C. preferably about 370° C. The object of this second sintering process is mainly to complete the reduction of the silver oxide, to reduce the nickel oxide formed during the first sintering process, and to give good mechanical strength to the electrode.

For purely illustrative and in no way limitative purposes, two detailed examples may be given of making electrodes according to the present invention:

EXAMPLE 1

600 grams of nickel from nickel carbonyl and 300 grams of fine silver oxide are mixed in the presence of 1250 cc. of benzene for 3 hours in an appropriate apparatus.

After decantation, the mixture is dried in the air. 6.5 grs. of this mixture are made into a tablet in a compression die with a diameter of 30 mm., with the aid of a hydraulic press with a power of 3000 kg. per cm.² The tablet is sintered in argon circulating at 2 litres per minute with the temperature rising, in two and one half hours, to 370° C. This temperature is maintained for 2 hours. Cooling is effected and a second sintering process is conducted under hydrogen at the same forementioned temperature.

EXAMPLE 2

A mixture is made, with the aid of a mechanical shaker in the presence of 300 cc. benzene, of 60 grams of nickel from nickel formate and 120 grams of silver oxide. After 5 hours of shaking, the powder mixture is dried under vacuum. 17 grams of this mixture are used to produce an electrode of 50 mm. in diameter, obtained through compression at 1500 kg. per cm.² by means of a hydraulic press. Final sintering and consolidation of this electrode are effected as shown in Example 1.

An electrode manufactured according to the invention, functioning at ambient temperature, can supply a high density current for a low polarization.

Electrodes according to the invention can, for example, find applications in the manufacture of electrochemical generators. Such generators are used for the direct transformation of chemical energy into electrical energy. In the present case, these generators are characterized by the fact that their positive and/or negative electrodes consist of the electrodes of the invention.

The electrodes of the present invention, when working as gas discharging electrodes, may also be used with advantage in an electrolytic device, with the object of generating one or several gases at the expense of the electrolyte.

For purely illustrative purposes, and in no way limiting the present invention, may be mentioned the use of the electrodes for discharging hydrogen in a water electrolysis cell, with the electrode for discharging oxygen being of a similar type. In such a case, the difference in potential applied between the two electrodes are greater than the current required to decompose the water.

Another example using the electrode of the present invention as a hydrogen discharging electrode is in a decomposition cell of an amalgam, for example, the mercury-sodium amalgam, where the second electrode consists of the amalgam itself.

The reaction in such a cell is as follows:
(a) Reaction at the level of the electrode consisting of the amalgam:

$$Na, Hg \rightarrow Na^+ + e^- + Hg$$

(b) Reaction in the electrolyte:

$$Na^+ + H_2O \rightarrow NaOH + H^+$$

(c) Reaction on the electrode in confirmity with the invention:

$$H^+ + e^- \rightarrow \tfrac{1}{2} H_2$$

An electrode in keeping with the present invention may also be used with advantage as an oxygen discharging electrode in mercury-sodium amalgam decomposition cells with a view toward recovering electrical current as a result of the general production process of soda, wherein the amalgam is attacked with water.

By reason of the catalytic capability of the electrodes of the present invention, the electrochemical reactions occurring at said electrodes take place under conditions approaching reversibility.

As a result of using the electrodes to discharge the gas of the said electrodes, it is possible to greatly reduce gas overvoltages, particularly hydrogen, on this electrode.

The electrodes according to the present invention may also be used with advantage as an auxiliary end for charge indicator electrodes, at the same time constituting a safety device against excessive increases of gas pressure in sealed alkaline accumulators.

It is to be understood that the invention is in no way limited to the method of manufacture described which has only been cited as an example. It is possible, without exceeding the scope of the invention, to effect modifications to details, change certain arrangements or replace certain methods with equivalent methods.

I claim:

1. A method for manufacturing an electrode for electro chemical reactions which comprises mixing a finely divided oxygenated silver compound with agglomerated grains of nickel in a liquid medium, in an amount sufficient to form a moistened mixture, air-drying the resulting mixture, compressing said mixture to form an electrode, heating said electrode in an inert atmosphere in a first heating stage at a temperature of about 250 to 500° C. for a time sufficient to decompose the oxygenated silver compound, the heating said electrode a second time in a reducing atmosphere at the same temperatures as in said first heating stage, for a time sufficient to complete a reduction of the oxygenated silver compound, to reduce the nickel oxide formed during the first heating stage and to give good mechanical strength to the electrode.

2. The method of claim 1 wherein the temperatures are increased from 250 to 500° C. in increments of about 100 to 150° C. per hour.

3. The method of claim 1 wherein the electrode contains about 5% to 85% by weight of the oxygenated silver compound and about 95% to 15% by weight of nickel.

4. The method of claim 1, wherein the mixture is compressed at a pressure of about 100 to 4,000 kg. per cm.²

5. The method of claim 1, wherein the reduced metallic nickel of the second heating stage has a surface state different from that of the original nickel.

6. The method of claim 1, wherein the electrode is cooled between the heating stages.

7. The method of claim 1, wherein the inert atmosphere is argon and the reducing atmosphere is nitrogen.

8. The method of claim 1, wherein the liquid medium is benzene.

9. The method of claim 3, wherein the oxygenated silver compound is silver oxide and the nickel is obtained from the decomposition of a nickel salt selected from the group consisting of nickel formate, nickel carbonate and nickel carbonyl.

10. A method for manufacturing an electrode for electrochemical reactions which comprises mixing about 5 to 85% by weight of a finely divided oxygenated silver compound with about 95 to 15% by weight of agglomerated grains of nickel in a liquid medium, in an amount sufficient to form a moistened mixture, air-drying the resulting mixture, compressing said mixture at a pressure of about 100 to 4,000 kg. per cm.² to form an electrode, heating said electrode in an inert atmosphere in a first heating stage at a temperature of about 250 to 500° C., for a time sufficient to decompose the oxygenated silver compound, and heating said electrode a second time in a reducing atmosphere at the same temperatures as in said first heating stage for a time sufficient to complete the reduction of the oxygenated silver compound, to reduce the nickel oxide formed during the first heating stage and to give good mechanical strength to the electrode.

11. The method of claim 10, wherein the mixture is compressed at a pressure of about 1500 kg. per cm.$^2$ and the electrode is heated in both stages at a temperature of about 370° C.

12. The method of claim 10, wherein the oxygenated silver compound and the agglomerated nickel are mixed together in equal amounts.

13. The method of claim of 12, wherein the oxygenated silver compound is silver oxide.

References Cited

UNITED STATES PATENTS

| | | | |
|---|---|---|---|
| 3,161,546 | 12/1964 | Yeager et al. | 136—86 |
| 3,220,937 | 11/1965 | Friese et al. | 136—86 |
| 3,230,114 | 1/1966 | Friese et al. | 136—86 |

WINSTON A. DOUGLAS, *Primary Examiner.*

H. FEELEY, *Assistant Examiner.*

UNITED STATES PATENT OFFICE
CERTIFICATE OF CORRECTION

Patent No. 3,389,019                      June 18, 1968

Paul Biro

It is certified that error appears in the above identified patent and that said Letters Patent are hereby corrected as shown below:

In the heading to the printed specification, line 5, "cancel "17 Ave. de Saxe, Paris, France" and insert -- Paris, France, assignor to Compagnie Generale D'Electricite, Paris, France, a corporation of France --.

Signed and sealed this 14th day of October 1969.

(SEAL)
Attest:

Edward M. Fletcher, Jr.
Attesting Officer

WILLIAM E. SCHUYLER, JR.
Commissioner of Patents